(12) United States Patent
Li

(10) Patent No.: US 11,937,688 B2
(45) Date of Patent: Mar. 26, 2024

(54) TOOTHBRUSHES AND AUDIBLE SIGNAL GENERATING COMPONENTS THEREOF

(71) Applicant: Smart Chip Microelectronic Co. Limited, Hong Kong (HK)

(72) Inventor: Kwei Chung Li, Hong Kong (HK)

(73) Assignee: Smart Chip Microelectronic Co. Limited, Hong Kong (HK)

( * ) Notice: Subject to any disclaimer, the term of this patent is extended or adjusted under 35 U.S.C. 154(b) by 458 days.

(21) Appl. No.: 17/355,191

(22) Filed: Jun. 23, 2021

(65) Prior Publication Data
US 2021/0393025 A1 Dec. 23, 2021

(30) Foreign Application Priority Data

Jun. 23, 2020 (HK) .......................... 22020009824.6

(51) Int. Cl.
| | |
|---|---|
| *A46B 15/00* | (2006.01) |
| *A46B 9/04* | (2006.01) |
| *A46B 13/02* | (2006.01) |
| *A61C 17/20* | (2006.01) |
| *A61C 17/34* | (2006.01) |
| *G08B 3/10* | (2006.01) |
| *H04L 25/49* | (2006.01) |
| *H04L 67/12* | (2022.01) |

(52) U.S. Cl.
CPC .............. *A46B 15/004* (2013.01); *A46B 9/04* (2013.01); *A46B 13/02* (2013.01); *A46B 15/0006* (2013.01); *A46B 15/0008* (2013.01); *A61C 17/20* (2013.01); *A61C 17/3436* (2013.01); *A61C 17/3445* (2013.01); *A61C 17/3472* (2013.01); *A61C 17/349* (2013.01); *G08B 3/10* (2013.01); *H04L 25/4902* (2013.01); *H04L 67/12* (2013.01)

(58) Field of Classification Search
CPC ..... A46B 15/004; A46B 15/0042; A46B 9/04; A46B 13/02; A46B 15/0006; A46B 15/0008; A61C 17/20; A61C 17/3427; A61C 17/3436; A61C 17/3445; A61C 17/3472; A61C 17/349; G08B 3/10; H04L 25/4902; H04L 67/12
See application file for complete search history.

(56) References Cited

U.S. PATENT DOCUMENTS

2011/0005015 A1* 1/2011 Iwahori .............. A61C 17/3481
15/22.1

FOREIGN PATENT DOCUMENTS

EP        2 961 059 A1 * 12/2015

* cited by examiner

*Primary Examiner* — Randall E Chin

(57) ABSTRACT

A toothbrush comprising a drive mechanism and electronic circuitry configured to drive the drive mechanism to execute toothbrushing motions is disclosed. The electronic circuitry comprises a drive circuitry and a controller which is configured to form a drive signal to operate the drive circuitry to generate drive current. The drive signal comprises a plurality of signal packets, wherein a signal packet has a signal packet duration and comprises a train of switching signals. The switching signals are configured to repeatedly switch on and switch off drive current supply to the drive mechanism at a switching frequency $f_s$. The signal packet duration is configured to define a rhythm of toothbrushing motions.

20 Claims, 6 Drawing Sheets

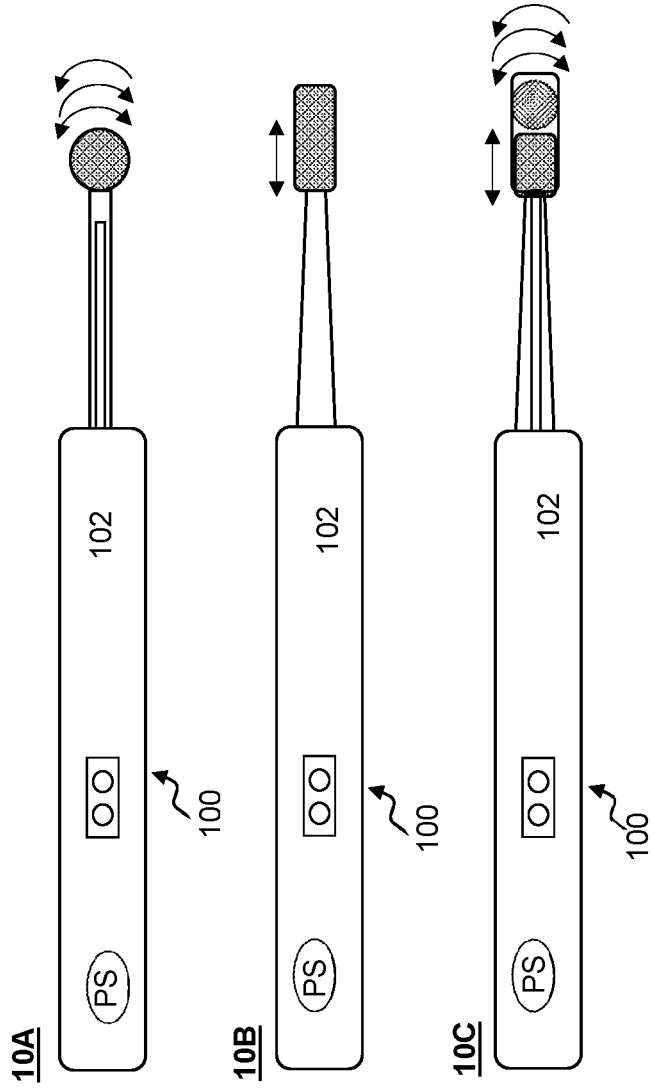
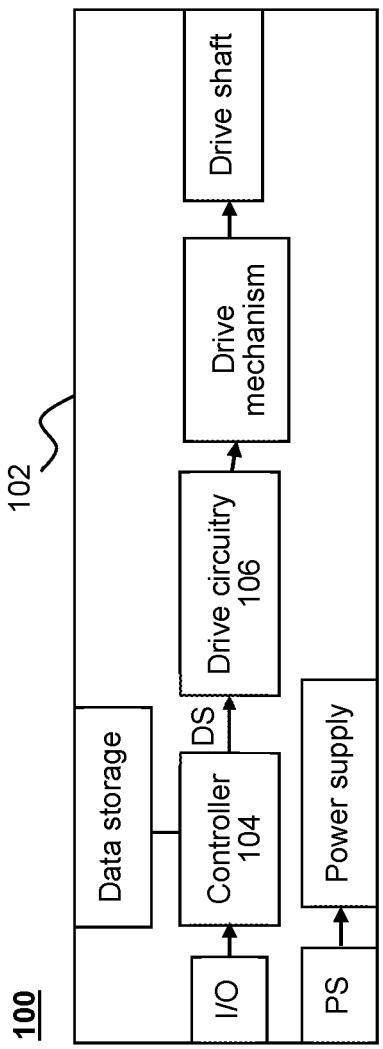
Fig. 1A  Fig. 1B  Fig. 1C  Fig. 2

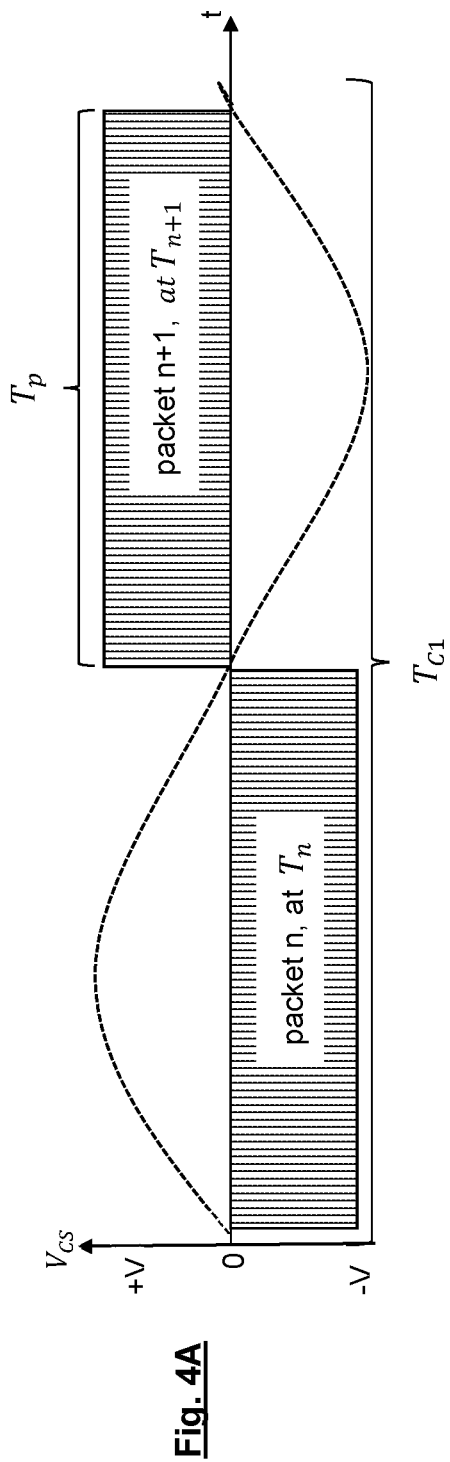
Fig. 4A
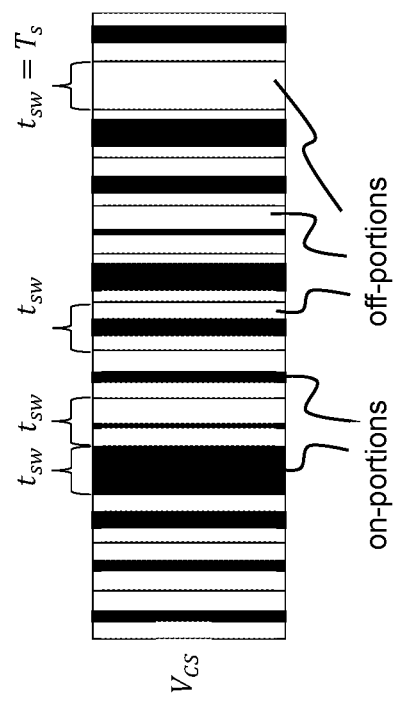
Fig. 4A1

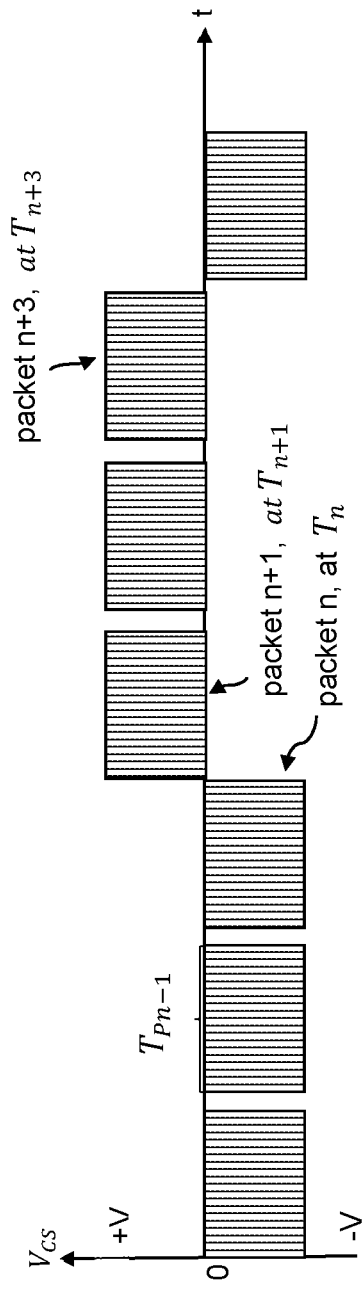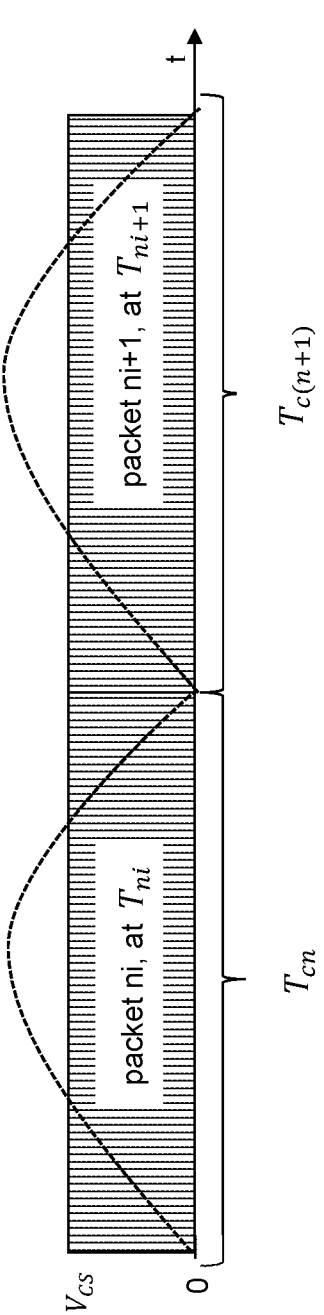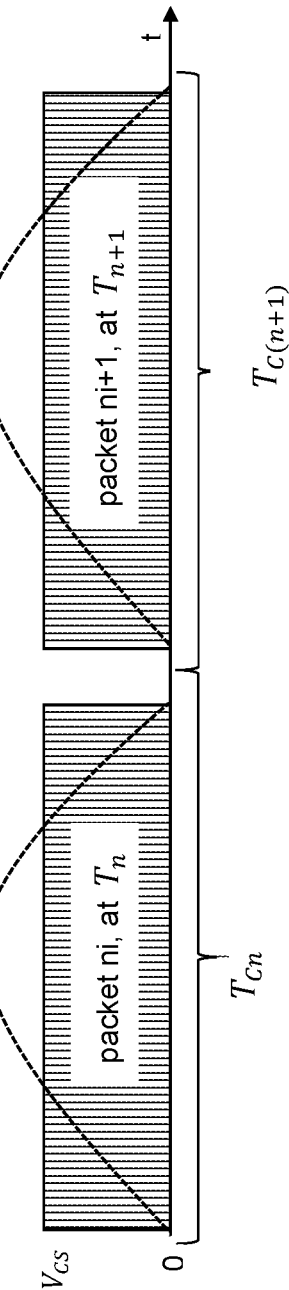
Fig. 4A2         Fig. 4B         Fig. 4B1

TOOTHBRUSHES AND AUDIBLE SIGNAL GENERATING COMPONENTS THEREOF

CROSS REFERENCE TO RELATED APPLICATIONS

The present application claims the benefit of Hong Kong Patent Application No. 22020009824.6 filed on Jun. 23, 2020, the contents of which are incorporated herein by reference in their entirety.

BACKGROUND OF THE INVENTION

Technical Field

The present disclosure relates to powered toothbrushes, and more particularly to powered toothbrushes which are operable to generate audible signals while performing toothbrushing operations, as well as devices which are configured to facilitate generation of audible signals by a toothbrush while performing toothbrushing operations.

Description of the Related Art

Powered toothbrushes, also known as electric toothbrushes or the like, have become a popular choice of toothbrushing tools. With the increasing popularity of powered toothbrushes, powered toothbrushes which are capable of generating sound are available.

Power toothbrushes can be divided into three categories of frequency and amplitude. The first category is high-frequency (20 k-45 k strokes per minute) and low-amplitude. The second category is low-frequency (below 10 k strokes per minute) and high-amplitude (above 0.5 mm). The last category is high-frequency and high-amplitude.

Studies show that powered toothbrushes have a maximum cleaning efficiency of 85% at an amplitude of 0.5 mm and a frequency of 10,000 cpm (cycles per minute), a maximum of 79% at an amplitude of 1 mm and a frequency of 7,000 cpm, a maximum of 86% at an amplitude of 3 mm and a frequency of 2,000 cpm, and an amplitude of 0.5-3.0 mm is preferred. ("Effects of Frequency and Amplitude of Vibratory Electric Toothbrushes on Cleaning Efficacy by Brushing Simulator", Toyokazu Mori, et. al, (Journal of the Japanese Society of Periodontology, 2005 Volume 47 Issue 3 Pages 137-145).

It is advantageous to devise novel powered toothbrushes which are operable to generate audible signals while performing toothbrushing operations, as well as devices which are configured to facilitate generation of audible signals by a toothbrush while performing toothbrushing operations.

BRIEF SUMMARY OF THE INVENTION

A toothbrush comprising a drive mechanism and electronic circuitry configured to drive the drive mechanism to execute toothbrushing motions is disclosed. The electronic circuitry comprises a drive circuitry and a controller which is configured to form a drive signal to operate the drive circuitry to generate drive current. The drive signal comprises a plurality of signal packets, wherein a signal packet has a signal packet duration and comprises a train of switching signals. The switching signals are configured to repeatedly switch on and switch off drive current supply to the drive mechanism at a switching frequency $f_s$. The signal packet duration is configured to define a rhythm of toothbrushing motions.

A method of operating a toothbrush to generate audio signals by toothbrushing motions is disclosed. The method comprises a controller forming a train of switching signals by a train of audio data, the audio data being digitized samples of an audible signal and having a sample frequency; the controller sending the audio data at the sample frequency to form the train of switching signals having the sample frequency as a switching frequency to operate a drive circuitry to generate a plurality of pulsed drive current components to drive a motor to perform the toothbrushing motions by the toothbrush.

BRIEF DESCRIPTION OF FIGURES

The subject matter of the present disclosure is described by way of example with reference to the accompanying figures, in which, FIGS. 1A, 1B and 1C are schematic diagrams of example powered toothbrushes embodying features of the present disclosure, FIG. 2 is a block diagram showing functional blocks of an example handle portion of the present disclosure, FIG. 4A is a schematic diagram showing a portion of an example bipolar drive signal, FIG. 4A1 is a schematic diagram showing an example portion of a signal packet, FIG. 4A2 is a schematic diagram showing another example bipolar drive signal, FIG. 4B is a schematic diagram showing a portion of an example unipolar drive signal, FIG. 4B1 is a schematic diagram showing a portion of an example unipolar drive signal, FIGS. 4C1 and 4C2 are schematic diagrams showing example unipolar drive signals, which cooperate to form the example bipolar drive signal of FIG. 4C.

DETAILED DESCRIPTION OF THE INVENTION

Figure 2A:
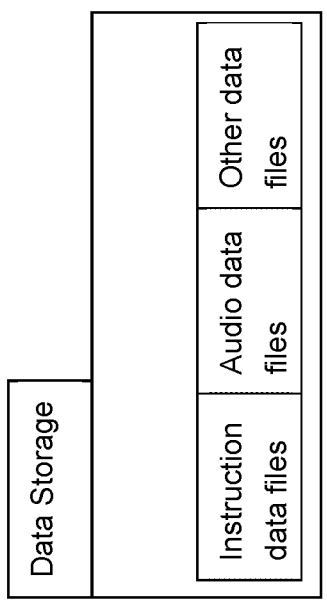
FIG. 2A is a block diagram showing example arrangement of data files with an example data storage device of an example toothbrush of the present disclosure.

An example electric toothbrush 10A, 10B, 10C comprises a toothbrush head and a handle portion 100 configured to drive the toothbrush head to perform toothbrushing operations, as depicted in FIGS. 1A, 1B and 1C. The handle portion 100 comprises a main housing and a drive assembly configured for driving the toothbrush head to execute toothbrushing motions. An example drive assembly comprises a motion generation assembly and electronic circuitries configured to drive the motion generation assembly to perform toothbrushing motions. The motion generation assembly typically comprises a drive shaft configured to drive the toothbrush head to perform brushing operations, a drive mechanism configured for driving the drive shaft, a drive circuitry configured to drive the drive mechanism. The electronic circuitries typically comprise a controller configured to transmit a drive signal to the drive circuitry to drive the drive mechanism, and optionally or additionally other peripheral components or circuitries. The drive assembly is usually received and/or mounted inside the main housing. In typical embodiments, a portion of the drive shaft protrudes from the main housing to permit detachable engagement with the housing of a toothbrush head.

An electric toothbrush (toothbrush herein in short) is typically configured for hand-held toothbrushing operations and the main housing is usually elongate and configured as a handle housing to facilitate hand-held toothbrushing operations (or operations in short), or more specifically, single-handed operations by a user. To facilitate single-handed operation, the main housing is shaped and dimension for palm-grip operations of a user so that a user can grip the handle housing with its palm to operate a power switch PS and to guide the toothbrush head to move around a user's oral cavity and to apply a brushing force to press the brushing head against the teeth to brush the teeth. The elongate main housing has a longitudinal axis extending along its length and defining a center axis of the toothbrush. The center axis is typically parallel to or coaxial with the motor shaft, which defines a motor axis.

The toothbrush head comprises a brushing head which comprises tufts of toothbrush bristles which are formed on a bristle carrier. The bristle carrier is typically molded of plastics and forms a base from which the bristles protrude. The bristles may be plastic, elastomeric, or a combination thereof. A toothbrush bristle may have a diameter of a few microns to one millimeter or a few millimeters. The brushing head is typically on a longitudinal end of a toothbrush and typically protrudes from a longitudinal end of the main housing. The toothbrush head typically comprises a neck portion which is intermediate the brushing head and the main housing. The neck portion is typically tubular and has an internal compartment through which a moving part passes to transit brushing motion to the brushing head. The bristle carrier, and therefore the bristles, is movable relative to the main housing to execute brushing motions to perform toothbrushing operations. The brushing motions may be reciprocating motions about a rotation axis or along an axis which is usually parallel to the longitudinal axis.

A toothbrush head may comprise a plurality of brushing heads which are movable relative to each other. The relatively movable brushing heads are typically configured to be driven by the motor to perform relative brushing motions. The plurality of brushing heads may be configured to perform reciprocating brushing motions about a rotation axis, along a longitudinal axis, or a combination thereof. Where a brushing head is rotatable about a rotation axis, the brushing head is typically rotatable relative to the neck portion and may be configured to rotate about a single direction, for example, clockwise CW direction, counter-clockwise CCW direction, or alternately between CW and CCW directions. In some embodiments, the toothbrush head comprises both movable and non-movable brushing heads relative to the neck portion, which is typically not movable relative to the main housing. The rotation axis is typically at an angle, for example, at right angle or within ±10, ±15, or ±30 degrees of right angle, to the longitudinal axis of the main housing. Where a brushing head is to execute reciprocating rotational motions about a rotation axis, the brushing head may be configured to oscillate about the rotational axis with an oscillation angle of within ±10, ±15, ±30, or ±45 degrees or more.

The toothbrush head may be mechanically coupled to the motor, for example, by means of the motor shaft, to output mechanical power for toothbrushing. In some embodiments, the toothbrush head may be magnetically coupled to the motor shaft to obtain toothbrushing power.

The toothbrush head may be detachable so that the toothbrush head can be replaced or changed and the handle portion can be reused with another toothbrush head. Where the toothbrush head is mechanically coupled to the motor and detachable, the motor shaft typically protrudes from the main housing and extends in the longitudinal direction to facilitate detachable mechanical engagement or latching with the toothbrush head.

An example handle portion 10 of a toothbrush of the present disclosure comprises a main housing 102, a drive mechanism, a drive shaft, and electronic circuitry. The electronic circuitry comprises a data storage device, a controller, a drive circuitry, a data interface (I/O), an on/off or power switch PS, a display comprising LED indicators, and a power supply, as shown in FIG. 2. The main housing is typically made of hard plastics and may comprise a waterproof compartment in which the drive mechanism and the electronic circuitry are housed.

The data storage device may comprise a volatile memory such as ROM or flash memory and/or a non-volatile memory such as RAM. The controller may be a microprocessor-based controller, gate-array-based controller, a logic-array-based controller, or other types of controller from time to time available for toothbrush applications. In example embodiment, example files, e.g. instruction data files and audio data files, are stored in the data storage device, as shown in FIG. 2A.

The drive mechanism typically comprises a motor, plus optionally, a power transmission mechanism such as a motion conversion mechanism where conversion from motor motion to brushing motion is required. The motor may be a DC motor such as a brushless DC motor BLDC or an induction motor for reliability. The DC motor may have its stator mounted on the main housing and its rotor mounted on the stator. The rotor may be a permanent magnet rotor and the stator comprises winding coils which are configured to generate a varying magnetic field to drive the rotor into rotation. The motion conversion mechanism interconnects the drive shaft and the motor and drive power is transmitted from the motor to the toothbrush head via the motion conversion mechanism. Where the toothbrush is without a motion conversion mechanism, the motor shaft is configured as a drive shaft which directly interconnects the motor and the toothbrush head. To facilitate performance of a plurality of different relative brushing motions of the brushing heads, the toothbrush may comprise a plurality of motion conversion mechanisms to convert the motor motion into the brushing motions. The toothbrush may comprise a single motion conversion mechanism where a toothbrush head has a single movable head. A motion conversion mechanism may be configured to convert motor motion into an oscillation motion about a rotation axis, which is also an oscillation axis, or into longitudinally reciprocating motions along a longitudinal direction which defines a reciprocating direction. The motor may be configured to rotate about a rotational axis in a single direction or to oscillate about the rotational axis without loss of generality.

The power supply is devised as a power source to provide electrical power for operation of the toothbrush. The power supply may comprise a DC power source or an AC power supply. The DC power source may comprise a battery and a battery charging circuit for charging the battery when the battery is a rechargeable battery. The power supply may comprise a power rectifier where the power source is an AC source. The power supply comprises a first supply rail which is biased at a first voltage and a second supply rail which is biased at a second voltage. The first voltage herein is a higher voltage and the second voltage is a lower voltage. In some embodiments, the second voltage is a reference voltage or a ground voltage of the drive circuitry.

The drive circuitry may comprise a unidirectional drive circuitry or a bidirectional drive circuitry. A unidirectional drive circuitry is configured to generate a unidirectional drive current and a bidirectional drive circuitry is configured to generate a bidirectional drive current. A half-bridge is an example of a unidirectional drive circuitry, while a full-bridge, also known as an H-bridge is an example of a bidirectional drive circuitry.

An example half bridge comprises a single switching bridge. The switching bridge comprises a plurality of electronic switches connected in series. In example embodiments, the plurality of electronic switches comprises a first semiconductor switch SW1 and a second semiconductor switch SW2 which are connected in series across a pair of power supply rails V1, V2 and has a common node CN which is connected to a terminal of the motor M, as shown in FIG. 3A. The common node is an output node of the half-bridge which is at a junction of the first and the second semiconductor switches. A semiconductor switch (switch in short) is a three-terminal switch which is operable in either an on-state or an off-state. The semiconductor switch SW comprises a first terminal which is an upstream terminal, a second terminal which is a downstream terminal, and a third terminal which is a control terminal. When an on-signal is applied to the control terminal, the semiconductor switch is turned on and enters in its on-state. When in the on-state, a current conductive channel having a very low impedance is formed between the first terminal and the second terminal to define a current path, electrical current will flow from a supply rail and enter the switch through the first terminal, travel along the current path with a very low voltage drop of a small fraction of a volt at the maximum, and exit through the second terminal. When an off-signal is applied to the control terminal, the switch is turned off and enters its off-state. When in the off-state, a channel having an extremely high impedance (in magnitude of at least several megaohms) is formed between the first and second terminals, and the current conductive channel during the on-state becomes an open-circuit having a prohibitively high impedance to block passage of motor-driving current. As a result, no motor-driving current can flow through the switch. A MOSFET is a typical example of a semiconductor switch.

Referring to FIG. 3A, the first terminal of the first switch SW1 is connected to the first supply rail V1 and the second terminal of the second switch SW2 is connected to the second supply rail V2. The half-bridge is configured such that the first and second semiconductor switches are alternately switched on and switched off during switching operations such that when the first switch SW1 is turned on, the second switch SW2 is turned off; and when the first switch is turned off, the second switch is turned on. The first and the second switches are not configured to be turned on simultaneously under normal operation conditions, since otherwise, a large current will flow through both the first and the second switch and the switches will be damaged. When the first switch of the half bridge is turned on, the second switch is turned off, the common node CN as an output node is at a voltage equal to or comparable to the first voltage $V_1$ of the first supply rail, and motor-driving current is to flow from the first rail into the first switch at the first terminal which is an upstream terminal, to flow out of the switch at its second terminal which is a downstream terminal, and then flow in direction A into the motor terminal via the common node which is electrically tied to the second terminal of the first switch. When the first switch of the half bridge is turned off, the second switch is turned on, the common node as an output node is at a voltage equal to or comparable to the second voltage $V_2$ of the second supply rail V2. Since the second voltage is a reference voltage of the drive circuitry, no motor-driving current is to flow through the motor M. The controller 104 is configured to control operations of the switching bridges by sending control signals to the control terminals of the switching bridges. The control terminals of the switches of the switching bridges are the control terminals of the switching bridge.

An example full-bridge comprises a first switching branch and a second switching branch. Each switching branch is a switching bridge having the configuration of a half bridge, that is, comprising a first semiconductor switch and a second semiconductor switch which are connected in series across a first power supply rail and a second supply rail, and has a common node which is connected to a terminal of the motor, the common node being an output node which is at a junction of the first and the second switches. For ease of reference, the first and second switches of the first switching branch are to retain the same switch numbering of the first and second switches, and the first and second switches in the second switching branch are renamed third and fourth switches respectively, and the common nodes of the first switching branch and the second switching branch are to be named the first common node (and first output node) and the second common node (and second output node) respectively.

Figure 3B:
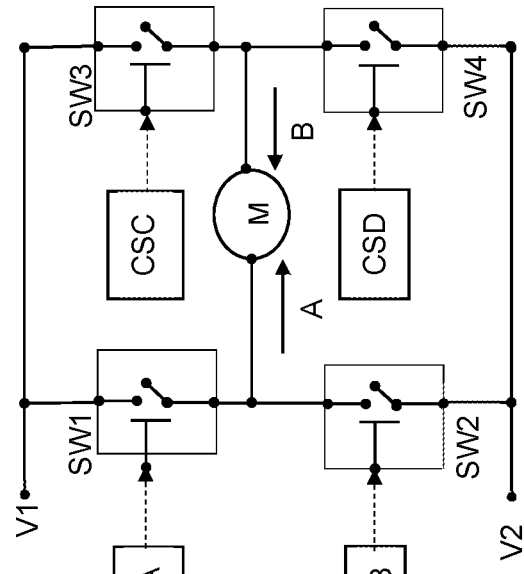
FIG. 3B is a schematic diagram of an example drive assembly comprising a full-bridge.
Figure 3A:
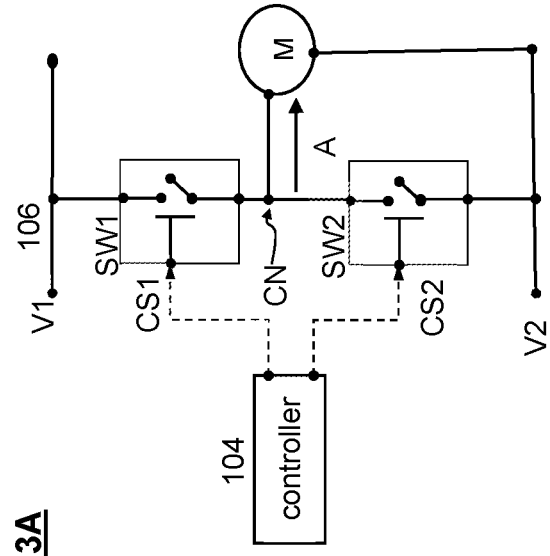
FIG. 3A is a schematic diagram of an example drive assembly comprising a single switching bridge.

In an example full-bridge and motor configuration, the first output node of the first switching branch is connected to a first terminal of the motor and the second output node of the second switching branch is connected to a second terminal of the motor, as depicted in FIG. 3B. A motor winding or a plurality of motor windings is connected between the first and second terminals of the motor such that a motor-driving current will pass through the motor winding(s) when there is a high enough potential difference appearing across the first and second motor terminals. A motor-driving current will traverse through the motor in a first direction A if the electric potential at the first motor terminal is higher than the electric potential at the second motor terminal. A motor-driving current will traverse through the motor in a second direction B if the electric potential at the first motor terminal is lower than the electric potential at the first motor terminal. When the motor-driving current is in direction A, the motor-driving current enters the motor at its first terminal and exits from its second terminal. When the motor-driving current is in direction B, the motor-driving current enters the motor at its second terminal and exits from its first terminal.

The full-bridge may operate in a unidirectional mode or in a bidirectional mode. A bidirectional mode comprising a first direction mode and a second direction mode. In the first direction mode, load-drive current flows in a first direction and, in the second directional mode, load-drive current flows in a second direction opposite to the first direction. In the bidirectional mode, load-drive current flows alternately in the first direction and the second direction. When the example circuitry of FIG. 3B operates in the first direction mode, the first switch SW1, the fourth switch SW4 and the motor winding(s) cooperate to form a first load current path which is a first motor-drive current path with the motor as a load. In the second direction mode, the third switch SW3, the second switch SW2 and the motor winding(s) cooperate to form a second load current path which is a first which is a second motor-drive current path.

When in the first direction mode, the first switch SW1 and the fourth switch SW4 are in the on-state to form the first motor-drive current path, the second switch SW2 and the third switch SW3 are in the off-state, and motor-driving current is to flow through the first motor-drive current path in the first direction A. More specifically, when in the first direction mode, the motor-driving current is to flow from the first supply rail V1 via the first switch SW1 into the motor M, exits the motor, and then returns to the second supply rail V2 via the fourth switch SW4.

When in the second direction mode, the second switch SW2 and the third switch SW3 are in the on-state to form the second motor-drive current path, the first switch SW1 and the fourth switch SW4 are in the off-state to block flow of load current, and motor-driving current is to flow through the second motor-drive current path in the second direction B. More specifically, when in the second direction mode, the motor-driving current is to flow from the first supply rail V1 via the third switch SW3 into the motor M, exits the motor, and then returns to the second supply rail V2 via the second switch SW2.

The first switch SW1 is an upstream switch of the first switching branch, the fourth switch SW4 is a downstream switch of the second switching branch, the upstream switch and the downstream switch of the component switching branches cooperate to form a first set of switches which cooperates with the motor M to form the first motor-drive current path having the first flow direction A. The third switch SW3 is an upstream switch of the second switching branch, the second switch SW2 is a downstream switch of the first switching branch, the upstream switch and the downstream switch of the component switching branches cooperate to form a second set of switches which cooperates with the motor M to form the second motor-drive current path having the second flow direction B.

The electronic circuitry is configured to send a drive signal to the drive circuitry and the drive circuitry upon receipt of the drive signal is to operate to perform switching operations to control the flow of motor-driving currents whereby the motion of the motor and the drive shaft is also controlled. More specifically, the electronic circuitry is configured to transmit a drive signal to the control terminals of the full-bridge to control switching operations of the motor-drive current paths. The control terminals of the example full-bridge are the control terminals of the first, second, third and fourth switches.

The controller may be configured to send a drive signal to the drive circuitry. To control switching operations of the drive circuitry, the controller may have its control ports connected directly to the control terminals of the drive circuitry or may connect to the control terminals of the drive circuitry by means of intermediate circuitry.

For example, the control terminals of SW1 and SW4 may be connected to a controller port, and the control terminals of SW2 and SW3 may be connected to the same control port as a common control port, albeit by a NAND gate. For example, the control terminals of SW2 and SW3 may be connected to a controller port, and the control terminals of SW1 and SW4 may be connected to the same control port as a common control port, albeit by a NAND gate.

For example, the control terminals of SW1, SW2, SW3, SW4 may be connected to four different control ports of the controller to facilitate more flexible control of the drive circuitry.

In some embodiments, the controller may be connected to the switching bridges via an intermediate circuit to minimized the number of controller control ports required while increasing control flexibility. For example, a timer circuitry such as a 555 IC may be connected between a controller port and the control terminals of the switching bridge.

The handle portion may be equipped with a unidirectional drive circuitry or a bidirectional drive circuitry. A handle portion may be equipped with a unidirectional drive circuitry and a motion conversion mechanism to convert a unidirectional motion into a bidirectional drive motion. The motion conversion mechanism comprises mechanical parts such as a cam-and-cam-shaft arrangement or an eccentric shaft and slot arrangement to convert a unidirectional motion such as rotational motion into bidirectional brushing motions such as oscillations or linearly reciprocating motions.

A handle portion equipped with a bidirectional drive circuitry may configured to operate in either a unidirectional mode or a bidirectional mode, for example, by the controller. For example, the controller may send a drive signal to operate the first set of switches alternately between the on-states and off-state, and to keep the second set of switches always in the off-state, so that motor-drive current will only flow through the first motor-drive current path in the first flow direction A to generate a unidirectional motion of the drive assembly. Alternatively, the controller may send a drive signal to operate the second set of switches alternately between the on-states and off-state, and to keep the first set of switches always in the off-state, so that motor-drive current will only flow through the second motor-drive current path in the second flow direction B to generate a unidirectional motion of the drive assembly. Alternatively, the controller may send a drive signal to operate the drive circuit alternately between the first direction mode and the second direction mode so that motor-drive current is to alternate between the first direction and the second direction to generate a bidirectional motion of the drive assembly. The first direction may be clockwise (CW) or counterclockwise (CCW). The second direction is clockwise (CW) when the first direction is counterclockwise and vice versa, i.e., counterclockwise (CCW) when the first direction is clockwise (CW).

In example embodiments, the toothbrush comprises a unidirectional drive circuitry which is configured to drive the motor and/or the drive shaft to rotate in a single direction.

The toothbrush may comprise a unidirectional drive circuitry and a motion conversion mechanism which is configured to convert a unidirectional motion into a bidirectional motion so that the toothbrush having a unidirectional drive circuitry can perform bidirectional toothbrushing motion.

A bidirectional toothbrushing motion comprises a plurality of brushing motion cycles. Each brushing motion cycle comprises movement in a first direction for a first duration and movement in a second direction for a second duration. A movement in a first direction for a first duration corresponds to a movement of a first angle and a first amplitude. A movement in a second direction for a second duration corresponds to a movement of a second angle and a second amplitude.

In example embodiments, the toothbrush comprises a bidirectional drive circuitry which is configured to drive the motor into bidirectional motions whereby the drive shaft performs bidirectional brushing motion. A toothbrush comprising a bidirectional drive circuitry may be operable in a unidirectional mode to execute unidirectional brushing motion in the first direction or the second direction as an option, for example, a user selectable option. When operating in the unidirectional mode, either the first set of switches SW1 and SW4 or the second set of switches SW2 and SW2 is operational. More specifically, when one set of switches is operational during the unidirectional mode, the other set of switches are non-operational and in the off-state.

In example modes of operations, the toothbrush is configured to execute toothbrushing motions when the power switch PS is turned on to supply operation power to drive the motor. In this mode of operation, the controller may be pre-configured to drive the motor to rotate, to oscillate, or to reciprocate along a longitudinal direction, at a predetermined motion frequency. The motion frequency may be between 20 Hz to 20 kHz, corresponding to 2,400 to 2,400,000 movements-per-minute where the brushing head is configured to execute oscillatory or reciprocating brushing motions. When the toothbrush is to execute oscillatory or reciprocating motions, a movement in a first direction for a first duration and a movement in a second direction opposite to the first direction for a second duration in combination form a complete motion cycle having a motion frequency in units of Hertz (Hz).

To operate the motor at a selected motion frequency, the controller may be configured to transmit a drive signal DS comprising a preselected or a predetermined motion frequency to the drive circuitry. The drive circuitry upon receipt of the drive signal DS will then operate the drive mechanism to operate at the preselected or a predetermined motion frequency.

While an electric toothbrush may be configured to operate in a wide frequency range, a brushing motion frequency of above 100 Hz and below 1,500 Hz is regarded as a good motion frequency range which would produce a good brushing performance for everyday tooth brushing. In general, the brushing motion frequency may be, for example, above 100 Hz, 200 Hz, 300 Hz, 400 Hz, 500 Hz, 600 Hz, 700 Hz, and below 1,400 Hz, 1,300 Hz, 1,200 Hz, 1,100 Hz, 1,000 Hz, 900 Hz, 800 Hz, or a range or ranges selected from a combination of any of the aforesaid values, for example, between 150 Hz and 400 Hz, and more particularly between 200-300 kHz. Of course, the toothbrush may be configured to operate at an ultrasonic frequency by a ultrasonic drive signal.

In example embodiments, for example where the motor is configured to operate in the sonic frequency by a sonic drive signal, the toothbrush head is configured to clean teeth substantially by agitation and the toothbrushing component is configured to provide a sufficient amplitude of movement to facilitate effective agitation. The movement amplitude may be within a few degrees, say 2-5 degrees about a rotation axis, or within an average amplitude of 0.2-0.6 mm for rotational oscillatory motion, or within a fraction of a millimeter, say 0.2-0.8 mm, for linear oscillatory motion. The average amplitude may be measured in a radial direction with respect to the rotation axis for a rotatable toothbrush head.

The drive mechanism is configured to be operated by a drive signal DS. In example configurations such as the present, the controller is configured to generate and/or transmit the drive signal DS to the drive circuitry. The drive signal DS on reaching the drive circuitry is to cause the drive circuitry to perform switching operations whereby motor-driving current is to flow through the motor intermittently.

An example drive signal DS comprises a train of switching signals. Each switching signal has a switching signal magnitude, a switching signal duration $t_{sw}$ and a switching frequency $f_{sw} = 1 t_{sw}$. Each switching signal has an on-signal portion and an off-signal portion, as shown in FIG. 4A1. An on-signal portion, also referred to as an on-portion or an on-signal, has an on-magnitude and an on-duration. The on-magnitude is typically at or above an on-threshold of a switch for the example drive circuitry herein. An off-signal portion, also referred to as an off-portion or an off-signal, has an off-magnitude and an off-duration. The off-magnitude is below the on-threshold of a switch. For the example drive circuitry, the on-threshold is an on-voltage at or above which the switch is turned on and below the switch is turned off.

The on-duration $t_{on}$ of an on-signal can be between 0% and 100% of the switching signal duration $t_{sw}$, the off-duration $t_{off}$ of an off-signal can be between 0% and 100% of the switching signal duration $t_{sw}$, and sum of the on-duration and off-duration of a switching signal equals the switching signal duration such that $t_{sw} = t_{on} + t_{off}$. The example drive signal comprises alternately disposed on-signals and off-signals which form a train of on-signals and immediately adjacent on-signals are interposed with an off-signal.

When a drive signal DS comprising a train of alternately disposed on-signals and off-signals appears at the control terminal of a switch of a drive circuitry, the switch will be alternately turned on and turned off following the on-and-off rhythms of the switching signals.

In example embodiments, an on-signal is in the form of an on-pulse and an off-signal is in the form of an off-pulse. An on-pulse may be a square pulse comprising a sharp rising edge and a sharp falling edge, between which the on-duration is defined. An off-pulse may be a square pulse comprising a falling edge and a rising edge, between which the off-duration is defined. An off-pulse may have a zero magnitude and the off-duration of a zero-magnitude off-pulse is defined by the falling and rising edges of a pair of immediately adjacent on-pulses which are in abutment with the off-pulse in the time axis t.

In example embodiments, the drive signal comprises a plurality of switching signal packets.

The plurality of switching signal packets forms a train of signal packets. Each switching signal packet (signal packet in short) comprises a plurality of switching signals and the plurality of switching signals forming a signal packet is in the form of a train of switching signals. A signal packet has a signal packet duration $T_p$ and a signal packet polarity. A signal packet may have a first polarity or a second polarity which is opposite to the first polarity. The polarity of a signal packet is dependent on the switching signals forming the signal packet. For example, a signal packet has a first polarity when the switching signals, or more specifically the on-signals, forming the signal packet has the first polarity. A signal packet has a second polarity when the switching signals forming the signal packet has the second polarity. In example embodiments, the signal packet duration $T_p$ is a duration defined between the first edge of the first on-signal and the second edge of the last on-signal of the switching signals forming the signal packet. For a signal packet having a positive polarity, the signal packet duration $T_p$ is defined between the first rising edge and the last falling edge. For a signal packet having a negative polarity, the signal packet duration $T_p$ is defined between the first falling edge and the last rising edge. The first polarity may be a positive polarity or a negative polarity.

The signal packet duration $T_p$ comprises a plurality of m consecutive time slots. Each time slot has a time slot duration $T_s$, m being a natural number larger than 1 such that $T_p=mT_s$, and adjacent time slots are in abutment. In example embodiments such as the present, the time slots have a uniform width of $t_{sw}$ and a uniform time slot duration $T_s$.

The on-magnitudes of the on-signals of the example drive signals are the same and the strength or amplitude of a switching signal is defined by the on-duration of an on-signal. Therefore, the example drive signal is a train of PWM (pulse-width-modulated) signals.

In example embodiments, the drive circuitry is driven by a bidirectional drive signal. A portion of an example bidirectional drive signal comprises signal packets of opposite polarities, as shown in FIGS. 4A and 4A2.

In example embodiments, the drive circuitry is driven by a unipolar drive signal. A portion of an example unipolar drive signal comprises signal packets of a single polarity, as shown in FIG. 4B.

The portion of the example bidirectional drive signal of FIG. 4A comprises a pair of signal packets. The pair of signal packets comprises a first example signal packet (packet n) of a first polarity and a second signal packet (packet n+1) of a second polarity. The first signal packet and the second signal packet are immediately adjacent signal packets of opposite polarities which cooperate to define a drive signal cycle having a drive cycle duration $T_c=T_{c1}$ and a drive cycle frequency $f_c$, where $f_c=1/T_c$.

The first example signal packet (packet n at $T_n$) has a first signal packet duration $T_p=T_{p1}$ and defines a first half drive cycle or first half-cycle in short. The second example signal packet (packet n+1 at $T_{n+1}$) has a second signal packet duration $T_p=T_{p2}$ and defines a second half drive cycle or second half-cycle in short. In this example, the first and the second signal packets have the same signal packet duration such that $T_{p1}=T_{p2}$ and $T_{p1}+T_{p2}=T_c$. The first example signal packet is formed from switching signals of a first polarity, which is negative voltage polarity, and has a first polarity of negative polarity. The second example signal packet is formed from switching signals of a second polarity, which is positive voltage polarity, and has a second polarity of positive polarity. Positive and negative polarities are opposite polarities.

The example drive signal of FIG. 4A is configured to generate a sinusoidal motion and has the on-signals and on-signal durations of the switching signals distributed to follow the magnitude distribution of a sinusoidal cycle, as shown by the dotted line of FIG. 4A. Since each example signal packet of FIG. 4A has a packet duration equal to half the drive cycle, each signal packet has a signal packet duration equal to half the drive cycle duration, i.e., $T_{c1}=2T_p$. Since the example signal packet is devised to correspond to a sinusoidal half cycle, the on-signal duration has a maximum at the center of the signal packet, a minimum (or zero) at its two ends, and the on-signal durations changes progressively between one end and the maximum to correspond to the change of amplitude values of a sinusoidal wave with respect to time.

In an example, the portion of the drive signal is devised to produce a sinusoidal vibration having an example drive cycle frequency $f_c$ of 220.5 Hz. When this portion of the drive signal is fed to the drive circuitry of FIG. 3B, the motor-drive current will drive the motor, and therefore the drive shaft and the toothbrush head, to move in the first direction for a first packet duration of $T_{p1}=2.74$ ms and then in the second direction for a second packet duration of $T_{p2}=2.74$ ms, corresponding to a brushing frequency $f_B$ equal to the cycle frequency $f_c$.

Each example signal packet is divided into an example plurality of m=50 consecutive time slots each having a time slot duration of 45.4 µs, corresponding to an example $f_{sw}$ of 22.05 kHz, and the example drive cycle has an example plurality of 100 consecutive time slots. A switching signal is allotted to each time slot of the signal packet so that there is a total of an example plurality of 100 switching signals in each example drive cycle. The switching signal allotted to a time slot can be an on-signal, an off-signal, or a combination of both on-signal and off-signal. Since each drive cycle is composed of k switching signals, the drive cycle frequency $f_c$ is related to the switching signal frequency $f_{sw}$ by the relationship $f_c=kf_{sw}$, where k=2 m in this example. Each switching signal can be regarded as a data, and a signal packet is composed of data having a data distribution frequency of $f_{data}$, where $f_{data}=f_{sw}$, at least in this example.

A sinusoidal motion of a specific frequency can be formed by devising a drive cycle duration $T_c$ to obtain a drive cycle frequency $f_c$ in the above manner. A motion comprising a plurality of sinusoidal waveforms can be formed by combining the amplitudes of the plurality of sinusoidal waveforms with respect to time without loss of generality. The sinusoidal motions or combined sinusoidal motions can be used to form motions comprising different frequencies without loss of generality.

While the example drive cycle has an example plurality of 100 time slots for receiving k consecutively distributed switching signals, where k is a natural number larger than 1, for example, larger than 10, 20, 40, 60, 80, 100, 200, 300, or more, and smaller than 1,000, 800, 600; or a range of ranges formed by a combination of any of the aforesaid values.

In example embodiments, each signal packet may be divided into a plurality of sub-packets, as shown in FIG. 4A2. In the example of FIG. 4A2, a plurality of sub-packets is grouped to form a train of sub-packets and a signal packet of a half-cycle. Each of the sub-packet is a discrete sub-packet and adjacent sub-packets are spaced apart by a plurality of switching signals having 100% off-portions. A signal packet comprising a plurality of spaced-apart sub-packets results in more complex brushing motions having additional brushing frequency components due to distribution of the sub-packets within the packet. The additional brushing frequency components have frequencies which are at least two times higher than the fundamental frequency defined by the drive cycle but lower than the switching frequency.

In example embodiments, the controller is configured to transmit a bidirectional drive signal to the drive circuitry to operate the H-bridge of FIG. 3B. The drive signal DS comprises a first control signal CSA for controlling the first switch, a second control signal CSB for controlling the second switch, a third control signal CSC for controlling the third switch, and a fourth control signal CSD for controlling the fourth switch. In this example, the first switch SW1 and the fourth switch SW4 form a first set of switches to define a first motor-drive current path and the second switch SW2 and the third switch SW3 form a second set of switches to define a second motor-drive current path. In this operation model, the switches forming a set of switches are to be synchronized so that the switches forming a set of switches are either all in the on-state or all in the off-state. Therefore, the first set of switches may be controlled by the first control signal CSA and the second set of switches may be controlled by the third control signal CSC. In example embodiments, the first set of switches is controlled by a first group of control signals and the second set of switches is controlled by a second group of control signals. In example embodiments, CSA or CSD may be selected as the first group of control signals and CSC or CSB may be selected as the second group of control signals.

In example embodiments, the controller is configured to cause signal packets of a first polarity to operate one set of switches of the full-bridge and signal packets of a second, opposite, polarity to operate another set of switches of the full-bridge. For example, the controller may be configured to cause signal packets of a first polarity to operate the first set of switches SW1, SW4 to generate brushing motions in a first direction A and to cause signal packets of a second polarity to operate the second set of switches SW3, SW2 to generate brushing motions in a second direction B.

The example drive signal of FIG. 4A is a bipolar drive signal configured to operate a bidirectional drive circuit such as the example drive circuitry of FIG. 3B. When a signal packet of the first polarity is in force to operate to turn on and turn off the first set of switches SW1, SW4, the first set of switches SW1, SW4 will be repeatedly turned on and turned off at the switching frequency $f_{sw}$ by the switching signals of the signal packet. As a result, motor drive current in the first direction A will intermittently flow through the motor and the motor shaft will move incrementally in the first direction as a result of the switched operations of the first set of switches. When a signal packet of the second polarity is in force to operate to turn on and turn off the SW3, SW2 will be repeatedly turned on and turned off at the switching frequency $f_{sw}$ by the switching signals of the signal packet. As a result, motor drive current in the second direction B will intermittently flow through the motor and the motor shaft will move incrementally in the second direction as a result of the switched operations of the second set of switches.

The intermittent movement is to begin at the first on-signal and end at the last on-signal of the signal packet. The amplitude of each incremental movement is determined by the on-signal duration of each on-signal and the total amplitude of motion due to the entire signal packet is dependent on the sum of the on-durations of all the on-signals. The drive shaft is to reverse motion direction when the signal packets change polarities.

In example embodiments where the switches forming a set of switches of a drive circuitry require an on-signal of a first polarity to turn on, but the signal packet configured to operate the switches has a second polarity, the polarity of the signal packets may be reversed, for example, by an inverting circuit, to facilitate control of the set of switches.

For example, where the switches of a drive circuitry require a positive on-signal to turn on but a signal packet devised to turn on the switches is a negative signal packet having a negative polarity and a negative on-magnitude, the negative signal packets in force are inverted to become positive signal packets having positive on-magnitudes for or before feeding to the switches.

For example, where the switches of a drive circuitry require a negative on-signal to turn on but a signal packet devised to turn on the switches is a positive signal packet having a positive polarity and a positive on-magnitude, the positive signal packets in force are inverted to become negative signal packets having negative on-magnitudes for or before feeding to the switches.

The example bidirectional drive signal of FIG. 4A comprises bipolar signal packets in which signal packets having a first polarity are configured for causing the motor to move in a first direction and signal packets having a second polarity are configured for causing the motor to move in a second direction. For convenience, signal packets having a first polarity are grouped together as a first group of signal packets and signal packets having a second polarity are grouped as a second group of signal packets.

Where a bidirectional drive circuity is to be operated by a bidirectional drive signal comprising bipolar signal packets, but the switches of the drive circuitry are operable by on-signals of a specific polarity, the bidirectional drive circuity may be operated by the bidirectional drive signal by, for example, by having one set of switches connected directly to the bidirectional drive signal, and the other set of switches connected to the bidirectional drive signal by means of an inverter circuit.

For example, where a first group of signal packets, comprising signal packet n and other signal packets having the same negative polarity as signal packet n, is devised for driving the motor in direction A, and a second group of signal packets, comprising signal packet n+1 and other signal packets having the same positive polarity as signal packet n+1, is devised for driving the motor in direction B, the drive signal is connected directly to the second set of switches of FIG. 3B and connected to the first set of switches of FIG. 3B by means of an inverter circuit.

When the drive circuitry operates during time Tn of FIG. 4A, a positive signal packet which is in force appears on the control terminals of the first set of switches of FIG. 3B (thanks to the inverter circuit which inverts the polarity of packet n from negative to positive) to switch on and off the first set of switches and a negative signal packet appears on the control terminals of the second set of switches of FIG. 3B so that the second set of switches remains in the off-state during time Tn.

When the drive circuitry operates during time Tn+1 of FIG. 4A, a negative signal packet which is in force appears on the control terminals of the first set of switches of FIG. 3B (thanks to the inverter circuit which inverts the polarity of packet n+1 from positive to negative), the first set of switches remains in the off-state during time Tn+1, and a positive signal packet appears on the control terminals of the second set of switches of FIG. 3B to switch on and off the second set of switches.

In some embodiments, the controller may be configured to convert a unipolar drive signal into a bidirectional drive signal to drive a bidirectional drive circuitry.

An example unipolar drive signal comprises a train of switching signals, as shown in FIGS. 4B and 4B1. The switching signals have a single polarity and are distributed in time slots having uniform time slot widths as described herein, and the switching signals have properties and characteristics described herein. The example drive signal comprises a first signal packet (packet ni) having a packet duration $T_{cn}$ and a second signal packet (packet ni+1) having a packet duration $T_{c(n+1)}$. To use the unipolar drive signal to drive a bidirectional drive circuitry, the controller may be configured to multiplex the drive signal such that the signal packet ni and other packets configured for generating motion in the first direction is time multiplexed to operate the first set of switches (and not the second set of switches) and signal packet ni+1 and other packets configured for generating motion in the second direction is time multiplexed to operate the second set of switches (and not the first set of switches).

In the example of FIG. 4B, each signal packet, packet ni, packet ni+1, has switching signals distributed to follow the magnitude distribution of a half-sinusoid with respect to time, and the multiplexing will result in a cycle of sinusoidal motion similar to that produced by FIG. 4A.

Figure 4C:
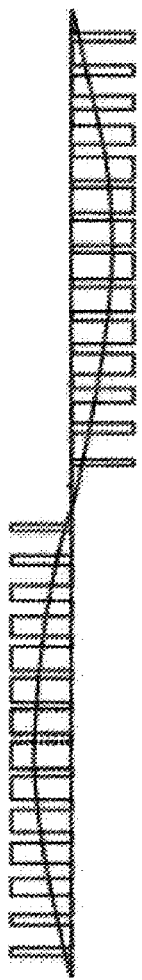
FIG. 4C is a schematic diagram showing a portion of an example bipolar drive signal constructed from a plurality of unipolar drive signals.
Figure 4C:
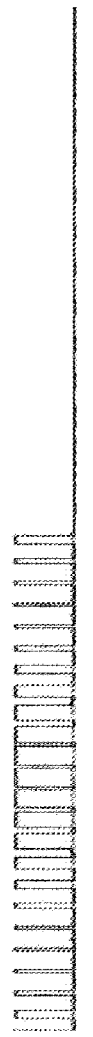
Figure 4C:
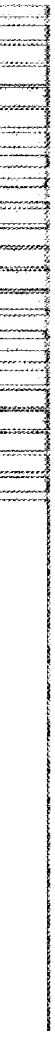

The unipolar drive signal of FIG. 4B1 is similar to that of FIG. 4B, except that adjacent signal packets In some embodiments, a bidirectional drive signal is constructed from a plurality of unipolar drive signals, for example, by signal subtraction. For example, the bidirectional drive signal shown in FIG. 4C can be constructed from subtraction of the signal of FIG. 4C2 and signal of FIG. 4C1.

Figure 5:
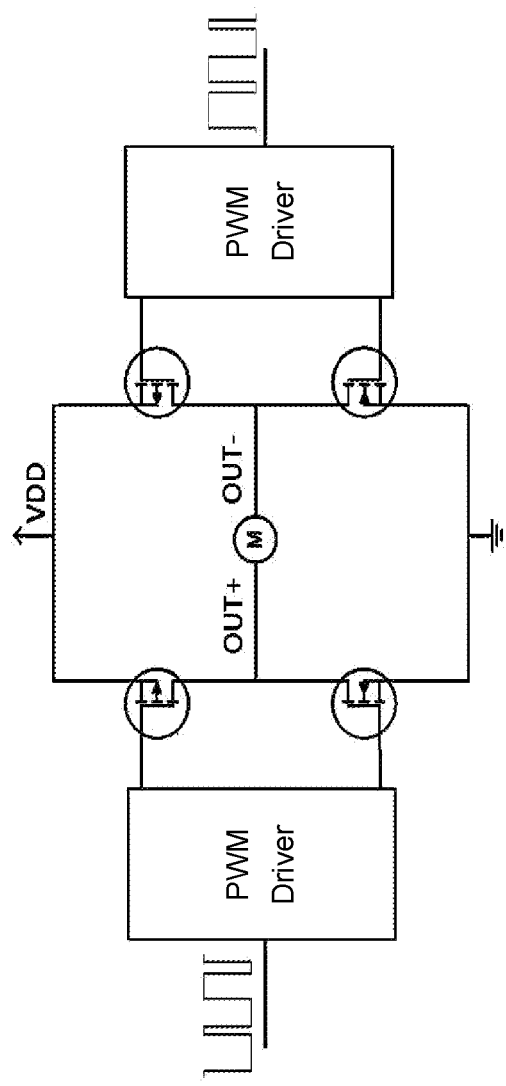
FIG. 5 is a schematic diagram an example drive circuitry.

Referring to FIG. 5, a first train of control signals and a second train of control signals to sent to the control terminals of the drive circuitry. More specifically, the first train of control signals is connected directly to the first switch SW1 and to the second switch SW2 by an inverter. the second train of control signals is connected directly to the third switch SW3 and to the fourth switch SW4 by an inverter.

By devising the first train of control signals and the second train of control signals such that the differences between the first train and the second control signal has a unipolar signal packet suitable for operating the first set of switches during Tn (and a signal packet not suitable for operating the second set of switches during Tn), and such that a unipolar signal packet suitable for operating the second set of switches during Tn+1 (and a signal packet not suitable for operating the first set of switches during Tn+1), a drive signal for driving a bidirectional drive circuitry into bidirectional motions is composed from a plurality of unipolar drive signals.

It would be advantageous if a toothbrush is capable of generating audible signals by its driving mechanism while performing toothbrushing operations. The audible signals may be a vocal message configured to deliver a voice message to a user, for example, to inform a user of its brushing conditions and/or brushing performance, or to provide brushing guidance to a user; to deliver a musical message to the user to make toothbrushing more enjoyable or to provide guidance on brushing times, etc.

Human ears perceive audio signals which are within a frequency range known as the audible frequency range. The commonly accepted audible frequency range is between 20 Hz (lowest audible pitch) and 20 kHz (highest audible pitch). Audio signals which are below the lowest audible pitch are referred to as infrasound or infrasonic sound and audio signals which are above 20 kHz are referred to as ultrasound or ultrasonic sound. Audible signals herein are audio signals which are within the audible frequency range, and are also referred to audible sound.

The audible signals may be in the form of a vocal message, a musical message, or a combination thereof. A musical message herein may comprise a song, a tune, a melody, a rhyme, a string of musical notes, or a combination thereof. The audible signals to be produced by a toothbrush herein are distinguished from spurious signals which are undesirable noise generated as a byproduct during toothbrushing operations of the toothbrush.

In example embodiments, the toothbrush is configured to produce audible signals by the motion generation assembly executing toothbrushing motions to alleviate the need of an extra transducer on the toothbrush. To produce audible signals by the motion generation assembly executing brushing motions, the drive signal may be loaded with audio data of an audible signal.

The audio data may be digitized samples of an audible signal obtained by sampling, synthesizing, or a combination thereof. To obtain audio data by sampling or synthesizing, a sampling or synthesizing frequency of at least two times the signal frequency is typically used to ensure fidelity of sound or audible signal reproduction. For example, sampling frequencies of above 40 kHz, for example, 44.1 kHz, 48 kHz, 88.2 kHz or 96 kHz are commonly used for music or acoustic recordings, while a lower sampling frequency of below 40 kHz is also used for applications where fidelity of reproduction may not be critical. For example a sampling frequency of 8 kHz is used for telephone and wireless microphone, 11.025 kHz (a quarter of CD sampling frequency of 44.1 kHz) is used for lower-quality PCM, MPEG audio files, 16 kHz is used for VoIP communication, 22.05 kHz is used for better-quality PCM, MPEG audio files, 32 kHz is used for mini-DV (digital video) recorder, and 37.8 kHz is used for CD-XA audio. A sample of an audible signal has characteristic sample frequency which is equal to the sampling frequency.

In example embodiments, the controller is configured to deliver a drive signal which has characteristics of an audible signal to the drive circuitry of the toothbrush whereby the motion-generating assembly is to produce vibratory motions characteristic of the audible signal to regenerate the audible signal. A drive signal comprising or constructed from digitized samples of an audible signal is characteristics of the audible signal. An audio datum herein is a digitized sample of an audible signal and the audio data of an audible signal have a characteristic sample frequency. The audible signal can be regenerated by transmission of the audio data of the audible signal at the sample frequency. The audio data may be pre-stored, synthesized and/or pre-synthesized. The audio data may be digital data, for example, encoded PWM (pulse-width-modulation) format in 8-24 bits, and stored, for example, on-board the toothbrush, or may be transmitted from an external source and received by the toothbrush for real-time generation while performing brushing operations.

Audio data of an audible signal are usually stored or arranged in a predetermined sequence.

To generate an audio signal using audio data of the audio signal, the audio data are delivered to a sound-generation circuitry in the predetermined sequence and according to a predetermined time spacing corresponding to the sample frequency.

The audio data of an audible signal may be stored on the data storage of the toothbrush.

The controller is configured to retrieve the stored audio data from the data storage and to deliver the audio data as a drive signal to the drive circuitry at a predetermined speed corresponding to the sample frequency to drive the drive circuitry. In example embodiments, a PWM coded audio data is a switching signal of the drive signal and the ensemble of audio data of the audible signal forms the drive signal such that the drive signal comprises a train of the audio data. For example, if the audio data has a sample frequency $f_s$, the controller will deliver the audio data at the rate of $1/f_s$ so that the time interval $t_s$ between two adjacent audio data is $t_s=1/f_s$.

In example embodiments, the controller is configured to arrange the audio data in signal packets for delivery to the drive circuitry. The signal packets may be bipolar signal packets and/or unipolar signal packets.

In example embodiments where the audio data are to form a bidirectional drive signal to drive a bidirectional drive circuitry, such as a bidirectional drive circuitry of FIG. 3B, the controller may be configured to process the audio data such that m audio data for forming packet n are to be output as negative switching signals to form a negative packet at time $T_n$ and the next m audio data for forming packet n+1 are to be output as positive switching signals to form a positive packet at time $T_{n+1}$, and to repeat this process in the aforesaid manner for other alternate signal packets. Alternatively, the controller may be configured so that the m audio data for forming packet n are to be sent as a signal packet to operate the first set of switches and the next m audio data for forming packet n+1 are to be sent as a signal packet to operate the second set of switches, and to repeat this process in the aforesaid manner for other alternate signal packets.

The number m of audio data per signal packet can be increased or decreased to control, i.e., to increase or decrease, the motion amplitude in each direction.

In example embodiments, the controller is configured to deliver the audio data in signal packets for delivery to the drive circuitry, in which a signal packet may comprise a plurality of spaced-apart sub-packets, as shown in FIG. 4A2.

Where the signal packets are spaced apart, with all off-signal between two adjacent signal packets, the sum of packet durations of the two adjacent signal packets is less than the drive cycle duration, i.e., $T_{p1}+T_{p2}<T_c$.

Figure 6:
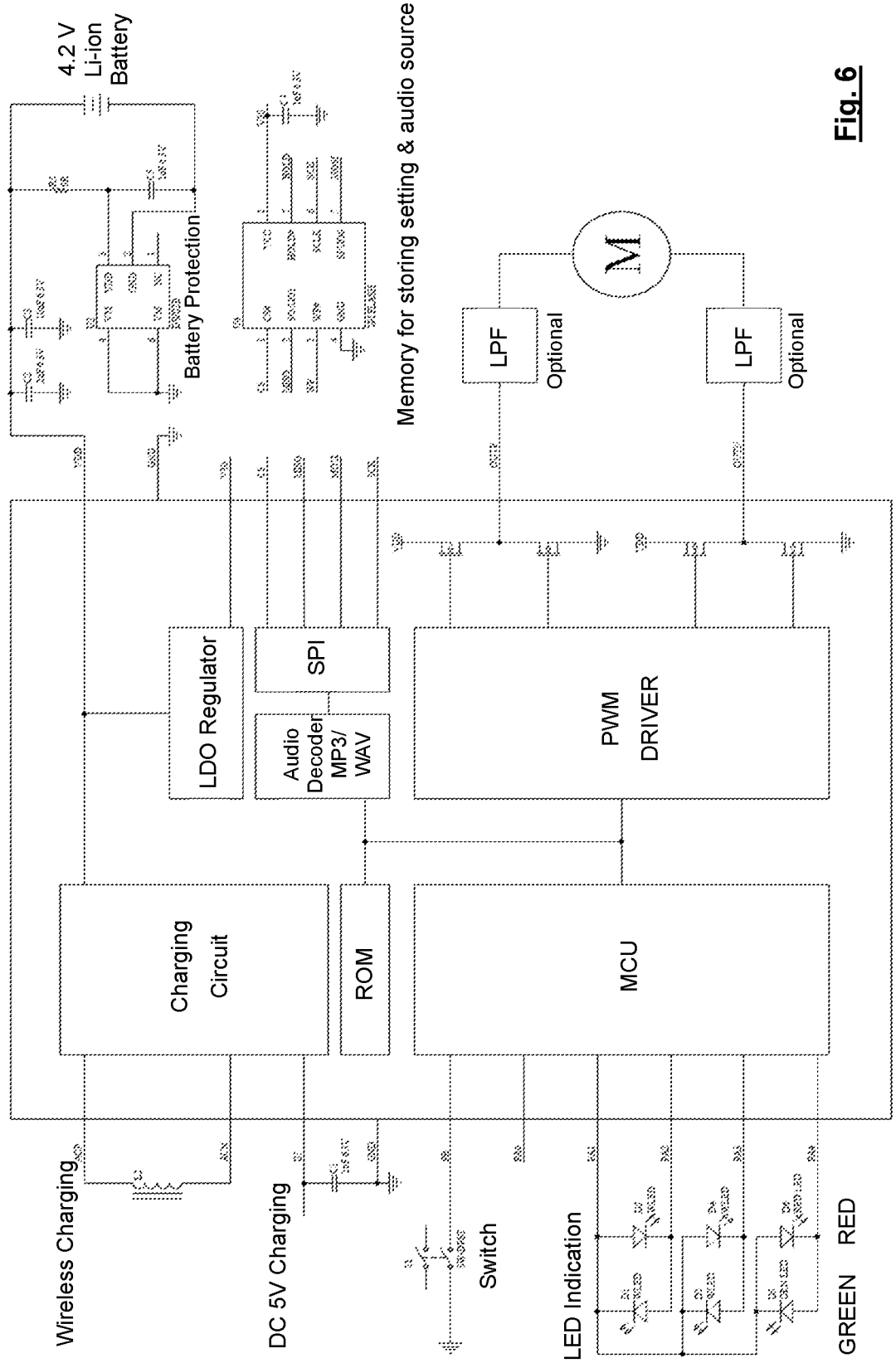
FIG. 6 is a schematic diagram of an example circuitry of an example toothbrush.

A unipolar drive signal such that that of FIGS. 4B and 4B1 can be used to generate a bidirectional drive current, for example, by using the example circuits of FIG. 5 and FIG. 6.

The controller may be configured to deliver a unipolar drive signal of FIGS. 4B and 4B1 which has characteristics of an audible signal to the unidirectional drive circuitry of the toothbrush whereby the motion-generating assembly is to produce vibratory motions characteristic of the audible signal to regenerate the audible signal.

Each signal packet of the audible signal generating toothbrush has an envelope which is defined by the audio data forming the signal packet. A drive signal comprising such signal packets facilitates simultaneous performance of brushing operations at a preferred brushing frequency or at preferred brushing frequencies and generation of audible signals of audio frequencies by the motion generating assembly.

In example embodiments such as the present, the audio component is embedded in the toothbrushing component. In another perspective, a signal packet of the drive signal is constructed by the audio component and the audio component defines the toothbrushing component.

The toothbrushing component comprises toothbrushing signals. The toothbrushing signals are configured to drive the toothbrush head to move at the preferred brushing frequency or at the preferred brushing frequencies.

Each signal packet comprises a plurality of audio data. Each audio data carries or contains a characteristic signal property of a portion of the audible signals in time. In embodiments such as the present, each audio data is a sampled data of an audible signal. A sampled data of an audible signal is a sample of the audible signal taken in time domain and is a discrete data. The audio data forming a signal packet are arranged to form a train of audio data. The audio data of the signal packets forming a train of signal packets collectively define the audible signals. In embodiments where the audible signal is synthesized, the audio data synthesizing the audible signal may be stored in a data format which is same as sampled data of a sampling frequency, and the synthesized audio data are classified as sampled audio data or audio data sample herein.

The audio data are distributed in time domain along a time axis t. The time axis t is divided into a plurality of time slots and each audio data is disposed in an individually assigned time slot. In example embodiments such as the present, the time slots are consecutive time slots in which adjacent time slots are in abutment and have a uniform width in the time domain, that is, have same time duration. In example embodiments such as the present, the audio data have different widths in the time domain and the widths range between 0% and 100% of the width $T_s$ of the time slot. As the time slots have uniform width in time and are in abutment, the time slots are distributed at uniform time intervals of $T_s$. In example embodiments such as the present, the audio data have same signal amplitude and different signal widths.

In example embodiments, each signal packet has an identifiable packet envelop and adjacent signal packets are identifiable or distinguishable with reference to the envelops of the signal packets. In some embodiments, adjacent signal packets have opposite polarities, for example, as shown in FIG. 4A. The characteristic envelop is defined by the train of audio data forming the signal packet. In some embodiments, adjacent signal packets have same polarity, for example, as shown in FIG. 4B.

In this specification, the terms bidirectional and bipolar are used interchangeably unless the context required otherwise. In the present specification, a plural includes a singular and a singular may mean a plural. While the disclosure makes references to examples or embodiments, the examples or embodiments are not intended to impose limits.

The invention claimed is:

1. A toothbrush comprising a drive mechanism and electronic circuitry configured to drive the drive mechanism to execute toothbrushing motions, wherein the electronic circuitry comprises a drive circuitry and a controller which is configured to form a drive signal to operate the drive circuitry to generate drive current, wherein the drive signal comprises a plurality of signal packets, wherein a signal packet has a signal packet duration and comprises a train of switching signals, wherein the switching signals are configured to repeatedly switch on and switch off drive current supply to the drive mechanism at a switching frequency $f_s$, and wherein the signal packet duration is configured to define a rhythm of toothbrushing motions.

2. The toothbrush of claim 1, wherein a signal packet duration defines amplitude or duration of a toothbrushing cycle or half a toothbrushing cycle, and the toothbrushing cycles define the rhythm of toothbrushing motions; and/or wherein each signal packet comprises a plurality of m time slots, wherein each time slot is allotted a switching signal such that a corresponding plurality of m switching signals is allotted in the plurality of m time slots; and wherein the toothbrushing motions comprises a plurality of toothbrushing cycles, each toothbrushing cycle has a brushing frequency which is smaller than or equal to the switching frequency divided by m, m being a natural number larger than 10.

3. The toothbrush according to claim 1, wherein the drive current comprises a plurality of drive current packets, wherein each drive current packet has a current packet duration equal to the signal packet duration, and wherein each drive current packet comprises a plurality of drive current components, and the drive current components are distributed in time slots each having a time slot duration $T_s$ equal to the reciprocal of the switching frequency $f_s$.

4. The toothbrush according to claim 1, wherein the drive signal comprises a plurality of unipolar signal packets, and wherein the electronic circuitry is configured to operate on the unipolar signal packets form drive current packets of opposite polarities to operate the drive mechanism to perform bidirectional toothbrushing motions.

5. The toothbrush according to claim 1, wherein the drive current has a first current direction during a first signal packet duration of a first signal packet and a second current direction during a second signal packet duration of a second signal packet; and wherein the first signal packet and the second signal packet are packets of a toothbrushing cycle.

6. The toothbrush according to claim 1, wherein the drive circuitry comprises a first switchable current path which is configured for drive current to flow in a first direction and a second switchable current path which is configured for drive current to flow in a second direction opposite to the first direction, the first switchable current path and the second switchable current path being alternative switchable current paths; and wherein the controller is configured to send unipolar signal packets to alternatively form the first switchable current path and the second switchable current path.

7. The toothbrush according to claim 6, wherein the drive signal comprises a first train of control signals and a second train of control signals, the first train of control signals and the second train of control signals comprising switching signals of same polarity; wherein the first switchable current path comprises a first set of switches and the second switchable current path comprises a second set of switches; and wherein the first train of control signals is supplied to the first set of switches and the second train of control signals is supplied to the second set of switches at the same time to form signal packets of opposite polarity to drive the drive mechanism into directional toothbrushing motions.

8. The toothbrush according to claim 1, wherein the switching signals are consecutive and are distributed in time slots having a uniform time slot width $t_{sw}$ to define the switching frequency; and/or wherein a switching signal comprises an on-portion having an on-portion duration and an off-portion having an off-portion duration in a time slot having a time slot width $t_{sw}$, wherein the time slot width is the reciprocal of the switching frequency $f_s$ such that $t_{sw}=1/f_s$, wherein the drive circuitry is configured to have a drive current component flowed through the drive circuit in response of an on-portion which is in force, and the drive current which flows through the drive circuit during the signal packet duration of a signal packet which is in force equals sum of on-portion durations of all on-portions of the signal packet in force and determines amplitude of movement of the drive mechanism during the signal packet duration of the signal packet which is in force.

9. The toothbrush according to claim 1, wherein the toothbrushing motions have a brushing motion frequency of below 2 kHz, including below 1.8 kHz, below 1.6 kHz, below 1.4 kHz, below 1.2 kHz, below 1 kHz, below 800 Hz, below 600 Hz; and/or the switching frequency is an ultrasonic frequency, including above 20 kHz, above 22 kHz, above 24 kHz, above 26 kHz, above 28 kHz, above 30 kHz, above 40 kHz.

10. The toothbrush according to claim 1, wherein the signal packet duration is configured to define a rotation angle about a rotation axis, the rotation angle being less than ±30 degrees, less than ±20 degrees, less than ±15 degrees, less than ±10 degrees, less than ±5 degrees, less than ±3 degrees, less than ±2 degrees; an/or wherein each switching signal has a switching signal duration less than 60 µs, less than 55 µs, less than 50 µs, less than 40 µs, less than 30 µs, or less than 20 µs; and/or wherein the signal packet duration is longer than 1 ms, 2 ms, 3 ms, 4 ms, 5 ms, 6 ms, 8 ms, or 10 ms.

11. The toothbrush according to claim 1, wherein the switching signals are audio data of an audible signal; and wherein the audio data are configured to operate the electronic circuitry to generate drive current to drive the drive mechanism into audible signal generating motions.

12. The toothbrush according to claim 11, wherein the audio data forming a signal packet are digitized samples of an audible signal; and/or wherein the audio data forming the switching signals are coded in PWM format; and/or wherein the audio data forming a signal packet are distributed to have an ultrasonic data distribution frequency.

13. The toothbrush according to claim 11, wherein the audible signals comprise a plurality of signal frequency components, and wherein the signal frequency components have signal frequencies of at or below 2 kHz, including 100 Hz, 200 Hz, 300 Hz, 400 Hz, 500 Hz, 600 Hz or above, and 2 kHz, 1.8 kHz, 1.6 kHz, 1.4 kHz, 1.2 kHz, 1 kHz or below, or a range or ranges formed by a combination of any of the aforesaid values.

14. The toothbrush according to claim 1, wherein the signal packet comprises an audio component and a brushing component having an envelope defined by the audio component.

15. The toothbrush according to claim 14, wherein the audio component comprises a plurality of audio data arranged in the form of an audio-data train.

16. The toothbrush according to claim 1, wherein two immediately adjacent signal packets are separated by a time gap formed by switching signals of off-magnitude or are formed by audio data of opposite signal polarities; and wherein the time gap is configured to define a motion stop.

17. The toothbrush according to claim 1, wherein each toothbrushing motion cycle comprises a plurality of pulsed motions, each pulsed motion having a pulse duration which is at or below the reciprocal of the switching frequency; and wherein each toothbrushing motion cycle comprises more than 20, more than 40, more than 60, more than 80, more than 100, more than 120, more than 150 pulsed motions.

18. The toothbrush according to claim 17, wherein each toothbrushing motion cycle comprises a plurality of pulsed motions in a first brushing direction and a plurality of pulsed motions in a second brushing direction opposite to the first brushing direction.

19. A method of operating a toothbrush to generate audio signals by toothbrushing motions, wherein the toothbrush comprises a drive mechanism and electronic circuitry configured to drive the drive mechanism to execute toothbrushing motions,
wherein the electronic circuitry comprises a drive circuitry and a controller which is configured to form a drive signal to operate the drive circuitry to generate drive current,
wherein the drive signal comprises a plurality of signal packets, wherein a signal packet has a signal packet duration and comprises a train of switching signals, wherein the switching signals are configured to repeatedly switch on and switch off drive current supply to the drive mechanism at a switching frequency $f_s$, wherein the signal packet duration is configured to define a rhythm of toothbrushing motions; and
wherein the method comprises a controller forming a train of switching signals by a train of audio data, the audio data being digitized samples of an audible signal and having a sample frequency; the controller sending the audio data at the sample frequency to form the train of switching signals having the sample frequency as a switching frequency to operate a drive circuitry to generate a plurality of pulsed drive current components to drive a motor to perform the toothbrushing motions by the toothbrush.

20. The method according to claim 19, wherein the switching frequency is above upper threshold frequency of human hearing.

\* \* \* \* \*